Figure 1:
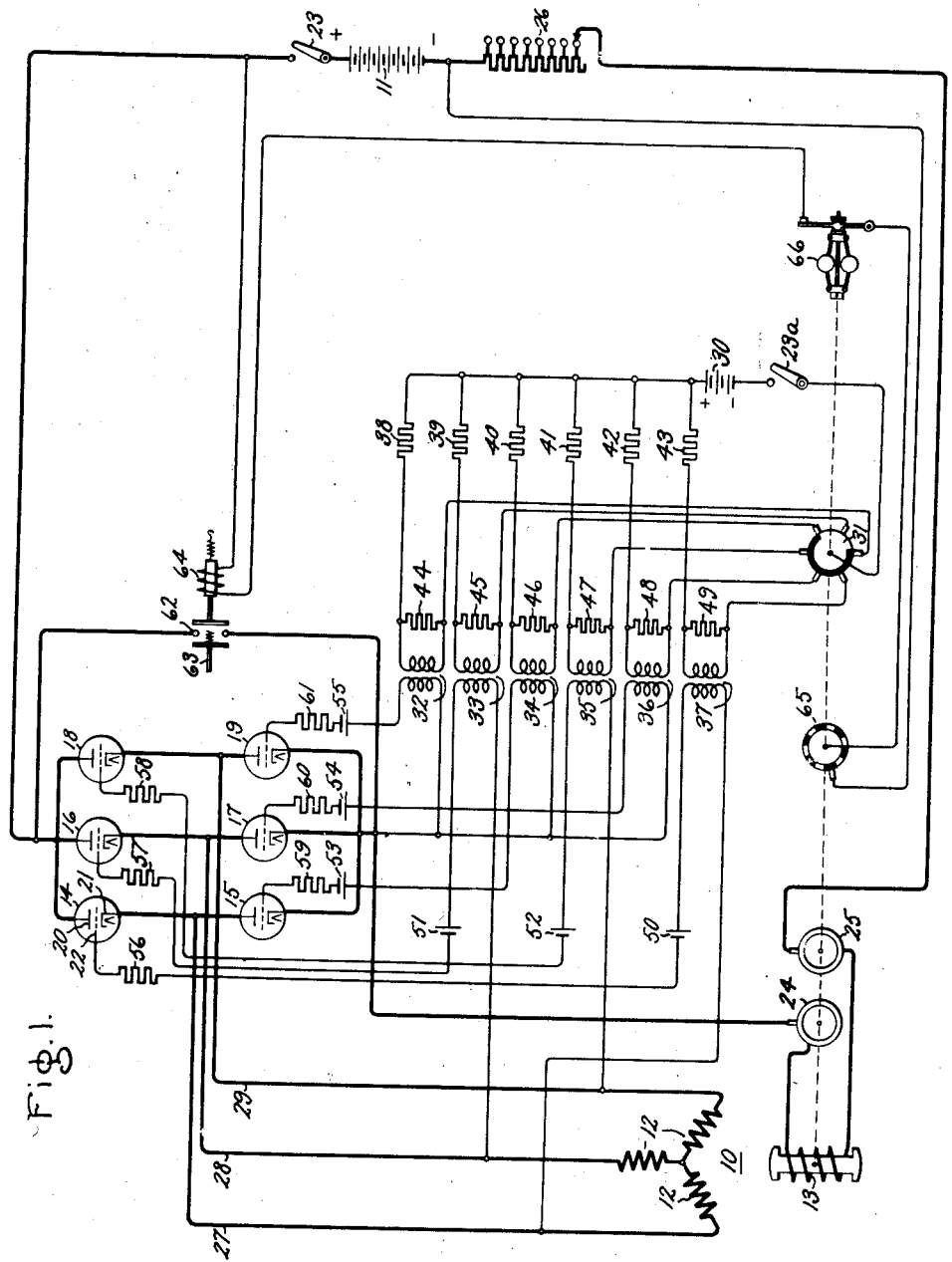

Nov. 11, 1941.  E. F. W. ALEXANDERSON  2,262,482
METHOD OF AND APPARATUS FOR STARTING AND OPERATING THYRATRON MOTORS
Filed April 26, 1939  2 Sheets-Sheet 1

Inventor:
Ernst F. W. Alexanderson,
by Harry E. Dunham
His Attorney.

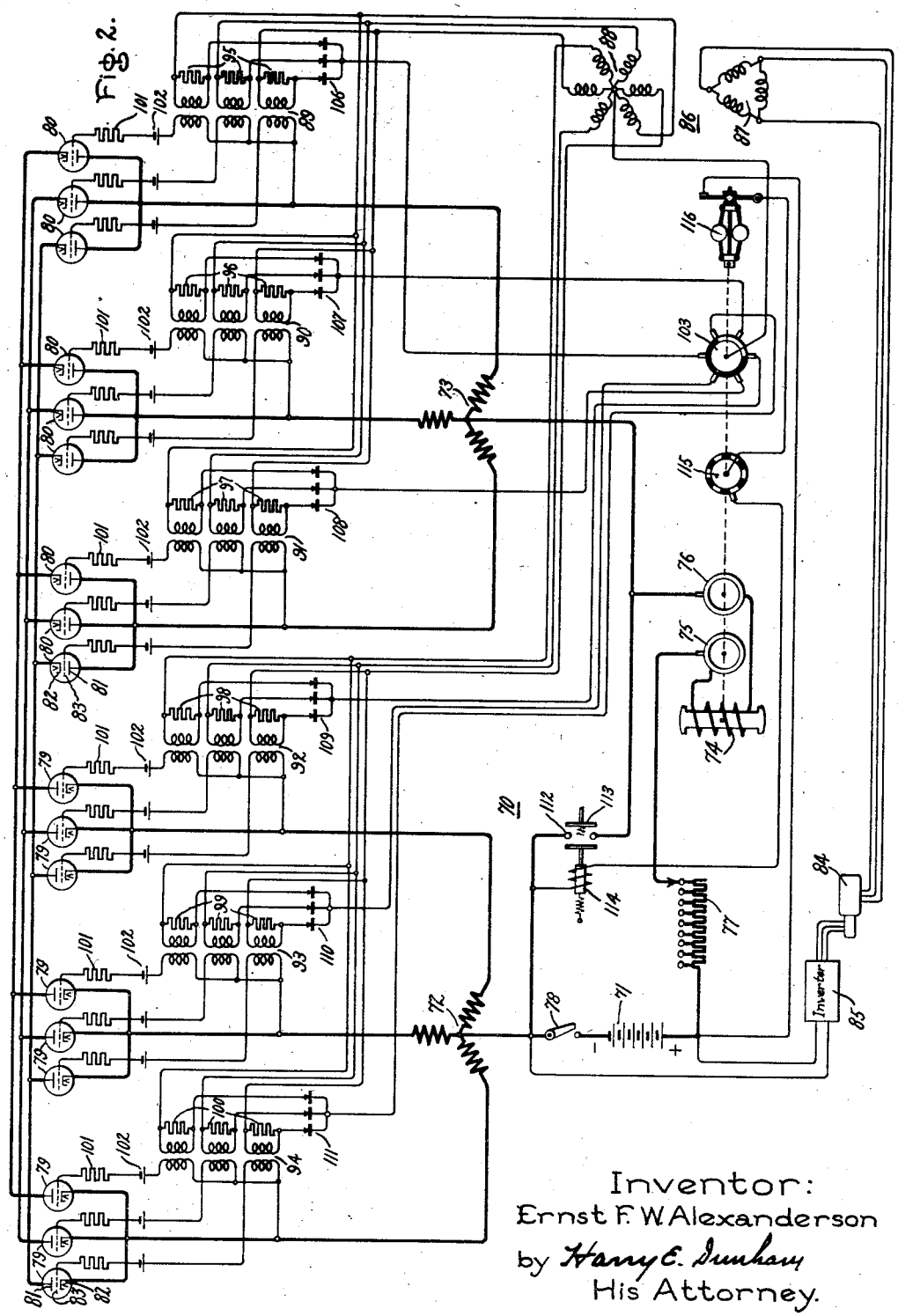

Patented Nov. 11, 1941

2,262,482

UNITED STATES PATENT OFFICE 2,262,482

METHOD OF AND APPARATUS FOR STARTING AND OPERATING THYRATRON MOTORS

Ernst F. W. Alexanderson, Schenectady, N. Y., assignor to General Electric Company, a corporation of New York Application April 26, 1939, Serial No. 270,187

18 Claims. (Cl. 172—274)

My invention relates to a method of and apparatus for starting and operating electric motors, and while it is of general application it is particularly useful for starting and operating alternating current motors of the synchronous type energized from a source of direct current through a plurality of electric valves.

Heretofore there have been proposed a number of arrangements including electric valves for operating electric motors from a direct current circuit, the electric valves operating in the manner of a conventional commutator but greatly reducing the number of armature sections or phase windings required. The use of electric valves of the vapor electric discharge type in such arrangements has been found particularly advantageous because of the relatively large amounts of power which may be handled with exceedingly low losses in the valves. In valves of this type of the form ordinarily used commercially at the present time the construction is not such as to effect interruption of a unidirectional current by means of the control electrodes of the valve, and hence some other means of interrupting the current or causing commutation is necessary. The counterelectromotive force of the electric motor may be used when sufficiently large to cause commutation, but particularly during starting and low speed operation of the motor, the motor does not develop sufficient counterelectromotive force to produce the necessary commutation of current between the valves. Several methods have been proposed wherein during the starting period of the motor a source of commutating potential or some means for generating this potential is provided in order that motors of this type may be started directly from a direct current source. One method of and apparatus for starting and operating electric motors is disclosed in Willis et al. Patent 1,995,876, dated March 26, 1935, and also in the Mittag Patent 2,130,890, dated September 20, 1938, both assigned to the same assignee as the present application. However, it would be desirable in some cases to be able to start an alternating current type of motor energized through a plurality of electric valves from a direct current source without having to supply a commutating potential and provide the necessary equipment for producing it during the starting period of said motor.

It is an object of my invention, therefore, to provide an improved method of and apparatus for starting and operating an electric motor energized from a direct current source through a plurality of electric valves, which will be economical to build and simple and reliable in operation.

It is another object of my invention to provide an improved method of and apparatus for starting and operating an alternating current motor of the synchronous type energized from a source of direct current, through a plurality of electric valves wherein it is unnecessary to supply a source of commutating potential during the initial starting period of said motor.

It is a further object of my invention to provide an improved method of and apparatus for operating an electric motor from a source of direct current through a plurality of electric valves in which the current is commutated between the several electric valves under low speed conditions by means of a current interrupter and in which the current is commutated between the several electric valves under normal running conditions by means of the counterelectromotive force of the motor.

Still another object of my invention is to provide an improved method of and apparatus for operating an electric motor from a source of direct current through a plurality of electric valves in which the current is forced to commutate between the several electric valves during the first portion of the starting period or under low speed conditions by interrupting the current flow through the electric motor and wherein means are provided to maintain the voltage of said electric valves at a value such that commutation of the current between the electric valves is effected by the counterelectromotive force of said motor during the latter portion of the starting period of said motor.

In accordance with the illustrated embodiment of my invention there is provided an electric motor of the alternating current type to which power from a battery is supplied through a plurality of electric valves. The current supplied to the motor is normally commutated between the electric valves by means of the counterelectromotive force of the motor. However, in order to start this electric motor directly from the battery I provide circuit interrupting means for intermittently short circuiting the electric valves or in the particular embodiment illustrated the electric valve and associated phase windings of the electric motor to interrupt the current flowing therethrough when commutation between the electric valves should take place. A variable resistance is provided to limit the current and also to absorb a portion of the voltage of the source whereby the counterelectromotive force of the motor may become sufficient during an early portion of the starting period to commutate the current between the various electric valves. A centrifugal switch causes the circuit interrupting means to become inoperative after the motor has come up to a predetermined speed.

My invention, both as to its organization and method of operation, together with other and further objects thereof, will best be understood by reference to the following description taken in connection with the accompanying drawings and its scope will be pointed out in the appended claims. In the accompanying drawings Fig. 1 illustrates an embodiment of my invention for operating a synchronous type of alternating current motor directly from a source of direct current, and Fig. 2 illustrates another embodiment of my invention applied to a motor of the alternating current type which is normally intended for operation from a source of alternating current and may be so operated but which is also arranged in accordance with my invention for operation directly from a source of direct current.

Referring now to Fig. 1 of the drawings, there is illustrated an arrangement wherein a synchronous type of alternating current motor 10 may be operated from a direct current source having a substantially fixed voltage such as battery 11. The motor 10 comprises a three-phase Y-connected armature winding having a plurality of phase windings 12 and a field winding 13 illustrated as the motor rotor, although it will be obvious to those skilled in the art that either the armature or the field winding may be made the rotating member. The armature phase windings 12 are energized through a plurality of pairs of electric valves 14, 15; 16, 17; and 18, 19 arranged in a three-phase full wave converter circuit. These valves may be any of the several types well known in the art, although I prefer to use valves containing an ionizable medium and which are provided with a control or starting electrode. Each of the electric valves 14 to 19 is provided with an anode 20, a cathode 21 and a control electrode or grid 22. The converter circuit including electric valves 14 to 19, inclusive, is connected to the positive terminal of battery 11 through a suitable switch 23 while the other side of the converter circuit is connected in series with field winding 13 through slip ring 24. The other terminal of field winding 13 is connected through slip ring 25 and variable resistor 26 to the negative terminal of battery 11. While I have shown a series type of motor it will occur to those skilled in the art that a shunt type of motor may equally well be employed without departing from my invention in its broader aspects. Alternating current conductors 27, 28 and 29 are provided, each interconnecting a different one of the terminals of armature phase windings 12 with a point intermediate a different pair of valves 14, 15; 16, 17; and 18, 19. In order to render electric valves 14 to 19, inclusive, conductive in proper sequence in accordance with the speed and position of the field of the electric motor it will be understood that any of the control circuits commonly used in the art will be satisfactory. However, I have provided a separate grid-to-cathode circuit for each of the grids 22 of electric valves 14 to 19 which grids are sequentially energized with positive direct current potentials from a battery 30 through switch 23a and distributor 31 driven directly from the motor shaft as indicated. Grid transformers 32, 33, 34, 35, 36 and 37 have their secondary windings connected in a different one of the grid-to-cathode circuits of each of electric valves 14 to 19 while the primary windings are connected in series with current limiting resistors 38, 39, 40, 41, 42 and 43 to battery 30 and distributor 31. Suitable discharge resistors 44 to 49 are connected across the primary windings of grid transformers 32 to 37 in order to prevent the transformer windings from becoming saturated from the pulses of direct current flowing therethrough. In case the several electric valves have a negative grid characteristic, separate negative bias batteries 50 to 55 may be included in the several grid to cathode circuits in series with current limiting resistors 56 to 61 as is well understood by those skilled in the art. In order to control the speed torque characteristics of electric motor 10 a brush shifting arrangement (not shown) may be provided for distributor 31 which is well known by those skilled in the art and which functions in a manner similar to that of the brush shifting arrangements used in connection with direct current motors.

In order to force the current, supplied to the phase windings 12 of motor 10 through electric valves 14 to 19, to commutate between the various electric valves during starting conditions of the motor when the counterelectromotive force induced in phase windings 12 by the field winding 13 is insufficient to cause commutation I provide means for intermittently effectively interrupting the current flowing through electric valve means 14 to 19 and armature phase windings 12 of electric motor 10 so that during the starting cycle commutation between the various electric valves will take place. The means for effectively interrupting the current flowing through the electric valves 14 to 19 is shown as a by-passing means for establishing a shunt path around the electric valves and the armature phase windings. In accordance with my invention the by-passing means may be either of the mechanical or electromechanical type or of a suitable electric valve type or a combination of the above. By way of example I have shown a mechanical type of by-passing means comprising contacts 62 in a circuit across electric valves 14 to 19 and armature phase windings 12 of electric motor 10 which may be bridged by pushbutton switch 63. The bridging of contacts 62 by means of pushbutton switch 63 causes a shunt path to be provided around electric discharge valves 14 to 19 and armature phase windings 12 of electric motor 10. Hence, if switch 63 is closed each time that current is to commutate from one group of valves to another motor 10 may be started directly from battery 11 without the provision of any source of commutating potential. In order that contact 62 may be bridged automatically each time that current is to be commutated from one discharge valve to another I have provided relay 64 adapted to be energized from battery 11. A rotary contactor 65 is mounted directly on the motor shaft as indicated and connected in series with relay 64 so that the current flowing through armature phase windings 12 may be intermittently interrupted at intervals when commutation between the several valves is to occur. It will be understood by those skilled in the art that as soon as the rotor of motor 10 has accelerated to a speed which is only a small percentage of normal speed, sufficient counterelectromotive force will be produced in armature windings 12, due to field winding 13, so as to provide the necessary commutating potential for commutating the current between the respective electric valves 14 to 19. Hence, I have provided means for indicating the proper counterelectromatic force such as a speed responsive means and illustrated as a centrifugal switch 66 mounted on the rotor shaft and connected in series with relay 64 so that when the counterelectromotive force of motor 10 is sufficient for commutation centrifugal switch 66 operates and disconnects relay 64 from battery 11. The resistance 26 in series with motor 10 must be varied during the starting period of the motor both to limit the current and also to absorb a sufficient amount of the battery energy during the initial starting period so that the counterelectromotive force of motor 10 may become sufficient at an early time during the starting period for commutating the current between the respective valves. Variable resistance 26 might be controlled by suitable means in accordance with the speed of the motor and means for accomplishing this will readily occur to those skilled in the art. The speed of motor 10 may be controlled by varying the position of the brushes on distributor 31.

In explaining the operation of the above described apparatus it will be assumed that switches 23 and 23a are open and that the rotor of motor 10 is in the position shown in Fig. 1. Also variable resistor 26 is in the position shown with the maximum resistance in series with motor 10. If it is desired to start motor 10 directly across battery 11 switches 23 and 23a are closed. By closing switch 23a a positive potential from battery 30 is impressed on the control electrode 22 of electric discharge valves 15 and 16 through the corresponding brushes making contact with the conducting segment of distributor 31, and current will therefore be allowed to flow from battery 11 through electric discharge valve 16, conductor 28, two of the phase windings 12 of the armature winding of electric motor 10, conductor 27 and electric discharge valve 15, field winding 13, resistor 26, back to battery 11. This flow of current through motor 10 will produce a torque causing the rotor of motor 10 to rotate, for example, in a clockwise direction which also rotates distributor 31. This causes the positive potential from battery 30 to be removed from the control electrode of discharge valve 15 and the control electrode of discharge valve 19 is energized with positive potential from battery 30. Since discharge valves 14 to 19 are of the discontinuous control type current will not cease to flow through discharge valve 15 merely by impressing a negative bias potential from battery 53 upon the control electrode 22 of valve 15. However, assuming for the moment that relay 64 is not operative, if switch 63 is moved so as to bridge contacts 62 the current flowing through valves 15 and 16 and armature winding 12 is effectively interrupted and hence the grid 22 of valve 15 may again obtain control so that when switch 63 is opened current will not again flow through valves 15 and 16 but instead will flow through valves 16 and 19. If this operation is repeated a few times the rotor of motor 10 will have accelerated to a sufficiently high speed that commutation of the current between the various valves will take place due to the counterelectromotive force induced in armature winding 12 by virtue of field winding 13. While the rotor of motor 10 is accelerating the resistance of variable resistor 26 is gradually decreased so that when full speed is attained the full voltage of battery 11 appears across motor 10. The manual operation just described is carried out automatically when rotary distributor 65 is utilized. Thus motor 10 may be started automatically as soon as switches 23 and 23a are closed without utilizing pushbutton switch 63 through the operation of relay 64. As may be observed when the rotor of motor 10 is in the position shown in Fig. 1, current from battery 11 cannot immediately flow through the coil of relay 64 when switch 23 is closed since the brush of rotary contactor 65 is on an insulating segment. However, as soon as current begins to flow through the motor windings the motor rotor begins to rotate driving rotary contactor 65 which shortly thereafter allows the brush of rotary contactor 65 to make contact with the conducting segment thereof, causing relay 64 to operate and effectively interrupting the current flowing through discharge valves 15 and 16. As soon as the brush of rotary contactor 65 breaks contact with the conducting segment, contacts 62 are opened and current may again flow through the particular electric valves upon the grids of which a positive potential has been impressed by battery 30 through distributor 31. Relay 64 operates intermittently until the rotor of motor 10 has accelerated sufficiently so that the counterelectromotive force induced in windings 12 is sufficient for commutating the current between the respective electric valves, whereupon the speed responsive means indicated by centrifugal switch 66 interrupts the control unit of relay 64. By properly controlling variable resistance 26 sufficient voltage from battery 11 may be absorbed so that at a very low speed the counterelectromotive force induced in motor 10 will be sufficient to cause commutation.

In certain cases it is very desirable to be able to operate a motor of the alternating current type from either a direct current source or an alternating current source through a plurality of electric discharge valves. For this reason it would be desirable to be able to apply my invention as disclosed in Fig. 1 to any of the well known variable speed alternating current types of motor which have been designed to be energized from an alternating current source through a plurality of electric discharge valves. Accordingly, in Fig. 2 I have applied my invention as disclosed in Fig. 1 to a type of alternating current motor illustrated in United States Letters Patent Reissue 20,364 of May 18, 1937. In Fig. 2 the motor 70, which is of the type normally employed for operation from an alternating current source, is arranged to be operated in accordance with my invention from a direct current source of substantially fixed voltage comprising a battery 71. The motor 10 comprises a pair of armature windings 72 and 73 each having a plurality of Y-connected phase windings provided with neutral terminals and a field winding 74 which is adapted to be connected to the neutrals of armature windings 72 and 73 through suitable slip rings 75 and 76. A variable resistance 77 and switch 78 are connected in series with battery 71 and field winding 74, the entire series circuit being connected between the neutral terminals of armature windings 72 and 73. A plurality of electric discharge valves 79 are associated with each phase terminal of armature winding 72 and a plurality of electric valves 80 are associated with each phase terminal of armature winding 73. Each of the electric valves 79 and 80 is provided with an anode 81, a cathode 82, and a control electrode 83. The anodes 81 of electric valves 79 associated with each phase of armature winding 72 are connected to different ones of a plurality of conductors, while the cathodes 82 of these valves are connected to the different phase terminals of armature winding 72. On the other hand, the cathodes 82 of electric valves 80 associated with each of the phase windings of armature winding 73 are connected to different ones of the plurality of conductors mentioned above, while the anodes 81 of electric valves 80 are connected to the various phase terminals of armature winding 73.

In order to control conductivity of the various valves 79 and 80 there is provided a control system which includes a phase shifter 84 energized with three phase alternating current from battery 71 through an inverter 85, symbolically shown. It will be understood by those skilled in the art, that any of the well known inverters for converting direct current into three phase alternating current may be used. Phase shifter 84 is arranged to energize a transformer 86 having a primary winding 87 and a six phase star-connected secondary winding 88. The secondary winding 88 supplies energy to a plurality of control transformers such as 89, 90, 91, 92, 93, 94, the primary windings of which may be provided with shunt resistors 95, 96, 97, 98, 99 and 100, respectively. The secondary windings of control transformers 89 to 94, inclusive, are connected in the grid-to-cathode circuit of each of the plurality of electric valves 79 and 80 in series with suitable current limiting resistors 101 and negative bias batteries 102. In order that these control transformers may be energized in accordance with the speed of the alternating current motor 70, there is provided on the shaft of the motor a distributor 103 having a plurality of brushes each brush controlling a group of transformers and arranged to control the moments of ignition of a group of valves. The conducting segment of distributor 103 is connected by means of a suitable brush (not shown) to the neutral point of the secondary winding 88 of transformer 86 and the outer extremities of the proper phase windings of secondary winding 88 are connected in series through the primary windings of transformers 89 to 94 through a plurality of unilaterally conductive devices 106, 107, 108, 109, 110, 111, respectively, to one of the distributing brushes of the distributor 103. While the control system shown is similar to that disclosed and claimed in United States Letters Patent 1,971,833, granted August 28, 1934, upon the application of Earl L. Phillipi for Electric valve converting system and excitation apparatus therefor, and which is assigned to the same assignee as the present application, any other suitable control system may be utilized in order to render conductive the various valves in the proper sequence so that the phase windings of armature windings 72 and 73 may become energized in proper sequence in accordance with the speed of the motor 70. Although I have symbolically shown an inverter 85 for converting the direct current from battery 71 into three phase alternating current, it will be understood that any suitable source of alternating current may be used to energize phase shifter 84.

In order effectively to interrupt the current flowing through the various discharge valves 79 and 80 and armature windings 72 and 73, I provide contacts 112 adapted to be bridged either by pushbutton switch 113 or relay 114. Relay 114 is connected in series with rotary contactor 115 and centrifugal switch 116 across battery 71. The operation of the apparatus disclosed in Figure 2 is similar to that described in connection with Figure 1 and it will be apparent to those skilled in the art, although a detailed description of the mode of operation of the control system is available in the patent above referred to.

Although I have described my invention as applied to a three phase alternating current motor, it will be obvious to those skilled in the art that it is equally applicable to a motor of any number of phases.

While I have shown and described my invention in connection with certain specific embodiments, it will of course be understood that I do not wish to be limited thereto since it is apparent that the principles herein disclosed are susceptible of numerous other applications and modifications may be made in the circuit arrangement and other instrumentalities employed without departing from the spirit and scope of my invention as set forth in the appended claims.

What I claim as new and desire to secure by Letters Patent of the United States, is:

1. In combination, a dynamo-electric machine provided with a plurality of phase windings, a source of direct current, means for energizing said machine from said source comprising an electric valve associated with each phase of said machine and means for intermittently by-passing current around said electric valves during a portion of the starting period of said dynamo-electric machine.

2. In combination, a dynamo-electric machine provided with a plurality of phase windings, a source of direct current, means for energizing said machine from said source comprising an electric valve associated with each phase of said machine, means for intermittently short circuiting said electric valves during a portion of the starting period of said dynamo-electric machine, and a variable impedance connected in series relation with said electric valve means.

3. In combination, a dynamo-electric machine provided with a plurality of armature phase windings and a rotating member, a source of direct current, means for energizing said machine from said source comprising an electric valve associated with each phase of said machine, and means for intermittently establishing a by-pass circuit around said electric valves during a portion of the starting period of said dynamo-electric machine in accordance with an operating condition of said rotating member.

4. The combination of an electric motor provided with a plurality of phase windings, a source of direct current, means for energizing said motor from said source including an electric valve associated with each of said phase windings, means for commutating the current between said valves while starting said motor comprising means for establishing intermittently a low resistance circuit in parallel with said valve to interrupt effectively the current flowing therethrough, and an excitation winding for said motor for commutating the current between said valves under normal running conditions.

5. The combination of an electric motor provided with a plurality of phase windings, a source of direct current, means for energizing said motor from said source including an electric valve associated with each of said phase windings, means for commutating the current between said valves under starting conditions comprising short circuiting means arranged to be intermittently operated during a portion of the starting period of said electric motor for interrupting the current flowing through said phase windings, an excitation winding for said motor for commutating the current between said valves under normal running conditions, and a variable impedance connected in series relation with said electric motor.

6. In combination, a source of unidirectional current having a substantially fixed voltage, an electric motor of the alternating current type having an armature winding including a plurality of phases and having electric valve means connected for controlling and sequentially energizing said winding and wherein commutation of current from the electric valves supplying one phase of said armature winding of said motor to another group of valves is effected by the counterelectromotive force of said motor, interrupting means for intermittently interrupting the current flowing through said armature winding during the first portion of the starting period of said electric motor, and variable impedance means for maintaining the voltage of said electric valve means at a value such that commutation of current between the electric valves is effected by the counterelectromotive force of said motor during the latter portion of the starting period.

7. An arrangement for starting an electric motor provided with a plurality of phase windings from a source of direct current comprising a plurality of electric valves interconnecting said windings with said source, and switching means connected so as to establish a low resistance circuit in parallel with said valves intermittently during a portion of the starting period of said motor.

8. An arrangement for starting an electric motor provided with a plurality of phase windings from a source of direct current potential comprising a plurality of electric valves interconnecting said windings with said source and each having a control electrode associated therewith, means for energizing said control electrodes to render said electric valves conductive successively, and switching means for completing a low impedance circuit in parallel with said electric valves to effectively remove the potential of said source from said electric valves at varied intervals during the first portion of the starting period of said motor to commutate the current between said valves.

9. An arrangement for starting an electric motor provided with a plurality of phase windings from a source of direct current comprising a plurality of electric valves interconnecting said plurality of phase windings, each of said valves having a control electrode associated therewith for controlling the conductivity thereof, means for energizing said control electrode to render said electric valves conductive successively, means for energizing said windings from said source, and means for effectively interrupting the current flow through said electric valves at varied intervals during the first portion of the starting period of said motor to commutate the current between said valves comprising means for intermittently short circuiting an electric path including in series certain of said electric valves and certain of said armature phase windings.

10. The method of operating an alternating current motor of the synchronous type energized from a source of direct current of substantially fixed voltage through a plurality of electric valves which comprises intermittently establishing a low resistance circuit in parallel with at least some of said electric valves to commutate the current between said electric valves during starting conditions, and electromagnetically inducing a potential in the motor windings to commutate the current between the valves under normal running conditions.

11. The method of starting an alternating current motor energized with direct current impulses directly from a source of direct current of substantially fixed voltage through a plurality of electric valves which comprises intermittently establishing a low resistance circuit in parallel with said valves to cause the current to commutate between the various valves.

12. The method of starting an alternating current motor arranged in a circuit including a variable impedance and energized with direct current impulses directly from a source of direct current of substantially fixed voltage through a plurality of electric valves which comprises intermittently establishing a low resistance circuit in parallel with said valves to cause the current to commutate between the various valves and simultaneously varying said variable impedance to maintain the voltage of said electric valve means at such a value that commutation of the current between the electric valves is effected by the counterelectromotive force of said motor.

13. The method of starting an alternating current motor energized from a source of direct current of substantially fixed voltage through a plurality of electric valves which comprises intermittently establishing a low resistance circuit in parallel with said electric valves to commutate the current between the various electric valves under starting conditions, and simultaneously increasing the potential applied to the motor terminals as the motor increases in speed.

14. The combination of an electric motor provided with a plurality of phase windings, a source of direct current, means for energizing said motor from said source including an electric valve associated with each of said phase windings, means for commutating the current between said valves while starting said motor comprising means for intermittently effectively interrupting the current flowing through the electric valves associated with said phase windings, and means operated in accordance with the speed of said motor for rendering said interrupting means ineffective when the counterelectromotive force of said motor attains a value sufficient to effect commutation.

15. The combination comprising a source of direct current of fixed voltage, an electric motor provided with a plurality of inductive windings, a pair of electric valves for each of said windings, a field winding arranged to be connected in series relation with said plurality of inductive windings, a variable impedance in series with said field winding, and switching means for establishing a low resistance circuit in parallel with said valves at varied intervals during the starting period of said electric motor, means for rendering said switching means inoperative when said electric motor has reached a predetermined speed, and means responsive to the speed of said motor for controlling the conductivity of said valves.

16. In combination, an electric motor provided with a plurality of phase windings, a source of direct current of substantially fixed voltage, means for energizing said motor from said source including an electric valve associated with each of said phase windings, means for commutating the current between said valves under starting conditions comprising means for interrupting the current flowing in said phase windings so as to short circuit said windings at intermittent intervals dependent upon the speed of said motor, means for rendering said interrupting means inoperative when a predetermined speed of said motor is obtained, an exciting winding for said motor for commutating the current between said valves under normal running conditions, and a distributor driven by the motor rotor for sequentially rendering said valves conductive in accordance with the mechanical position of the motor rotor.

17. The combination comprising a source of direct current, an electric motor provided with a plurality of Y-connected windings including neutral terminals, a field winding for said motor, a variable impedance connected in series with said motor field winding and said source between the neutrals of said plurality of Y-connected windings, a plurality of electric valves connecting said Y-connected windings in series with one another, each of said valves having a control electrode associated therewith for controlling the conductivity thereof, means for energizing said control electrodes to render said valves conductive in a predetermined sequence, and means for establishing a low impedance circuit in parallel with said Y-connected windings and said valves at various intervals during the starting period of said motor for commutating the current between the various electric valves as they are rendered conductive so that the starting of said motor may be effected directly from said direct current source.

18. The combination of an electric motor provided with a plurality of phase windings, a source of direct current, means for energizing said motor from said source including an electric valve associated with each of said phase windings, means for commutating the current between said valves during the starting period of said motor comprising means for intermittently establishing a circuit of low resistance in parallel with said valves, and means responsive to the speed of said motor for rendering said last mentioned means ineffective at a predetermined time during the starting period of said motor.

ERNST F. W. ALEXANDERSON.